US012126130B2

(12) United States Patent
Fehling et al.

(10) Patent No.: US 12,126,130 B2
(45) Date of Patent: Oct. 22, 2024

(54) SPRING-LOADED TERMINAL FOR CONDUCTOR

(71) Applicant: Weidmüller Interface GmbH & Co. KG, Detmold (DE)

(72) Inventors: Stephan Fehling, Lage (DE); Walter Hanning, Detmold (DE); Michael Herrmann, Detmold (DE); Heike Schmidtpott, Bad Salzuflen (DE); Andreas Rutz, Bielefeld (DE); Michael Lenschen, Detmold (DE); Karlo Stjepanovic, Bielefeld (DE)

(73) Assignee: Weidmüller Interface GmbH & Co. KG (DE)

(*) Notice: Subject to any disclaimer, the term of this patent is extended or adjusted under 35 U.S.C. 154(b) by 207 days.

(21) Appl. No.: 17/780,182

(22) PCT Filed: Nov. 26, 2020

(86) PCT No.: PCT/EP2020/083500
§ 371 (c)(1),
(2) Date: May 26, 2022

(87) PCT Pub. No.: WO2021/105280
PCT Pub. Date: Jun. 3, 2021

(65) Prior Publication Data

US 2022/0416449 A1 Dec. 29, 2022

(30) Foreign Application Priority Data

Nov. 28, 2019 (DE) ......................... 102019132316.9

(51) Int. Cl.
*H01R 4/48* (2006.01)

(52) U.S. Cl.
CPC ....... *H01R 4/48365* (2023.08); *H01R 4/4814* (2023.08); *H01R 4/48455* (2023.08)

(58) Field of Classification Search
CPC .... H01R 4/48365; H01R 4/48; H01R 4/4814; H01R 4/48455; H01R 4/4835
See application file for complete search history.

(56) References Cited

U.S. PATENT DOCUMENTS 10,553,978 B2 2/2020 Juelich et al.

FOREIGN PATENT DOCUMENTS

DE 1213024 3/1966
DE 20300266 U1 5/2004
(Continued)

*Primary Examiner* — Renee S Luebke
*Assistant Examiner* — Paul D Baillargeon
(74) *Attorney, Agent, or Firm* — Laubscher & Fretwell, P.C.

(57) ABSTRACT

A spring-loaded terminal is designed as a direct plug-in terminal for connecting a conductor. The terminal includes a busbar for contacting the conductor, a clamping spring for retaining the electrical conductor in the terminal, and a retaining spring for latching the clamping spring in an open position so that the conductor can be inserted into a contact area. The clamping spring has a pivotable clamping leg and a clamping edge. The retaining spring has a pivotable pivoting leg having at least one retaining device as a first latching device. The clamping leg has a corresponding latching device cooperating with the retaining device of the pivoting leg in a latching state of the clamping leg. The clamping leg is adjustable from the latching state by displacing the electrical conductor into a clamping state in which the clamping leg is unlatched from the retaining device and presses the electrical conductor with the clamping edge of the clamping leg against the busbar. The latching device of the clamping leg is spaced from the clamping edge of the clamping leg.

3 Claims, 16 Drawing Sheets

(56) References Cited

FOREIGN PATENT DOCUMENTS

| | | | | |
|---|---|---|---|---|
| DE | 102015118574 A1 | | 5/2017 | |
| DE | 202016007200 U1 | * | 10/2017 | ........... H01R 13/193 |
| DE | 202016104971 U1 | | 12/2017 | |
| DE | 102019121442 A1 | * | 2/2021 | ......... H01R 4/48365 |
| EP | 2466689 A1 | | 6/2012 | |
| EP | 2768079 A1 | | 8/2014 | |
| EP | 2843764 A1 | | 3/2015 | |
| EP | 2947718 A1 | | 11/2015 | |
| JP | 2016058331 A | | 4/2016 | |
| WO | WO2017214651 A1 | | 12/2017 | |

* cited by examiner

SPRING-LOADED TERMINAL FOR CONDUCTOR

This application claims priority of PCT/EP 2020/083500 filed Nov. 26, 2020 which claims priority of DE 10 2019 132316.9 filed Nov. 28, 2019, the entire contents of which are incorporated herein by reference.

BACKGROUND OF THE INVENTION

The present invention relates to a spring-loaded terminal having a busbar which is provided for contacting an electrical conductor, in particular a stranded conductor, and having a spring which is provided for fixing the electrical conductor in the spring-loaded terminal.

Such spring-loaded terminals in the form of direct plug-in or push-in terminals with a compression spring that presses the conductor against the busbar are known in a variety of embodiments.

BRIEF DESCRIPTION OF THE PRIOR ART

For example, it is known to latch the clamping springs—compression springs—in an open position so that a conductor can be easily guided into a contact area. According to known prior art, this latching of the clamping spring in an open position is effected by an actuating device such as a pusher which can be latched to the terminal housing, with the pusher holding the clamping leg in an open position. By releasing the actuating device after insertion of the conductor, the clamping leg can relax and press the conductor against the busbar. A disadvantage is that the actuating means must be released manually in order to contact the conductor.

EP 2 466 689 A1 describes a spring-loaded terminal in which an integral clamping spring latches onto a clamping edge of a clamping leg of the clamping spring. A disadvantage of this design of latching the clamping leg is the relatively high wear of the clamping edge of the clamping spring, which occurs when the spring-loaded terminal is switched on.

Also known from EP 2 768 079 A1 is a spring-loaded terminal in which a multi-part clamping spring is latched to a free end of a spring leg of the clamping spring. This spring-loaded terminal has proven itself well in practice, but the relatively high wear of the clamping edge of the clamping spring, which occurs when the spring-loaded terminal is switched on, is disadvantageous.

SUMMARY OF THE INVENTION

It is therefore an object of the present invention to provide a spring-loaded terminal for conductors, in particular for stranded conductors, in which the wear of the clamping edge of the clamping spring is reduced. In addition, incorrect plugging or premature release of the clamping spring is prevented.

A spring-loaded terminal for connecting a conductor, in particular for connecting a stranded conductor is provided which has a busbar for contacting an electrical conductor and a clamping spring acting as a compression spring for fixing the electrical conductor in the spring-loaded terminal and a retaining spring for latching the clamping spring in an open position so that the conductor can be inserted into a contact region in a sliding direction.

In this case, the clamping spring has a clamping leg with a clamping edge that can be pivoted about a first pivot axis in a pivoting direction, and the retaining spring has a pivoting leg that can be pivoted about a second pivot axis, wherein the pivoting leg has at least one retaining device for retaining the clamping leg in the open position. The clamping spring and the retaining spring can be designed integrally with each other, which is particularly cost-effective, but they can also be manufactured separately and then connected to each other, in which case the spacing of the latch from the clamping edge has an advantageous effect in each case.

It is further provided that the pivoting leg has the at least one retaining device as a first latching device and the clamping leg has a counter- latching device cooperating with the retaining device of the pivoting leg in the latching state of the clamping leg in order to hold the clamping leg in the open position. The clamping leg is adjustable from a latching state, in which it is latched to the pivoting leg by the retaining device of the latter and is held in the open position or conductor insertion position, by displacing the electrical conductor into a clamping state, in which the clamping leg is released from the retaining device and unlatched and presses the electrical conductor with the clamping edge of the clamping leg against the busbar, so that the conductor contacts the busbar.

Furthermore, the counter-latching device of the clamping leg is formed at a distance from the clamping edge of the clamping leg.

A spring-loaded terminal is thus created which separates the latching mechanism of the clamping spring from the clamping edge for pressing the conductor against a busbar and advantageously reduces the wear of the clamping edge of the clamping spring by this functional separation.

It is thus preferably advantageously provided that the retaining device of the pivoting leg is not directly latched to the clamping edge of the clamping leg.

In this way, the retaining device cannot rub against the clamping edge when it is released from the clamping edge. The clamping edge is thus protected in a simple manner against excessive wear caused by a wiring operation.

It is also advantageous to prevent incorrect insertion or premature release of the clamping spring since the latching mechanism is not located in the conductor insertion area.

In terms of design, this can be implemented, for example, in that the latching device of the clamping leg is formed on the clamping leg at a distance of more than 1 mm, in particular more than 3 mm, from the clamping edge of the clamping leg.

The spring-loaded terminal also includes a restoring device for pivoting back the clamping leg, with which the clamping leg can be pivoted back from the clamping state to the latching state R by displacing the restoring device against the pivoting direction, In order to achieve an advantageously simple design of the clamping spring, the clamping spring can be formed in one piece with the retaining spring. This results in a simple assembly process for the clamping spring and cost-effective manufacture of the clamping spring.

However, it may also be provided that the spring-loaded terminal has, in addition to the clamping spring, a retaining spring which is manufactured separately per se, but the clamping spring and the retaining spring may be connected to one another by a connection.

According to a further preferred embodiment of the invention, the clamping spring may have a support leg with which it is supported on a corresponding abutment.

The abutment can be an abutment leg of the busbar. However, it can also be provided that the abutment is the terminal housing.

The fact that the retaining spring can have a pressure surface which can be arranged transversely to the slide direction or conductor insertion direction provides a simple and effective and thus advantageous manner of disengaging the clamping spring through the conductor end. It is also advantageous if the retaining device is integrally formed on the pivoting leg. This results in a simple design implementation of the retaining device on the pivoting leg.

According to a further preferred embodiment of the invention, the pivoting leg can be of an angled design. It is also advantageous if the pressure surface adjoins a first leg of the pivoting leg which is bent downwards with respect to the conductor insertion direction and an upper bend of the clamping spring. This further simplifies the design of the connection device. It can also be advantageous for the clamping leg to form a kind of angular shape in itself, as this increases the design possibilities in geometrical terms.

It is also advantageous if the retaining device of the pivoting leg—i.e. the first latching device—is formed in one embodiment by a latching edge arranged at the end of a second, upwardly curved leg of the angular pivoting leg. This results in a simple structural implementation of the retaining device on the pivoting leg.

In a further embodiment, the retaining device of the pivoting leg can also be designed as at least one flared tab of the pivoting leg. Such a constructive design results in a simple and thus advantageous constructive implementation of the retaining device on the pivoting leg.

In a further preferred embodiment of the invention, the retaining device of the pivoting leg can be formed as at least one hook or at least one web and be integrally formed with the pivoting leg. The hook can again protrude from the pivoting leg, preferably substantially against the conductor insertion direction or “upwards”. This again results in an advantageously simple structural design of the retaining device. Several hooks, preferably two hooksk, may also be provided.

Particularly advantageous—since they are compact and can be implemented without a large amount of waste—are embodiments in which the respective hook is cut out laterally or alternatively—centrally from the material of the pivoting leg and is bent out of the latter and serves to engage behind a corresponding edge or tab or the like on the clamping leg, which is located at a distance from the clamping edge in a recess or hole in the clamping leg.

The first, downwardly bent leg (section) and the second, upwardly bent leg (section) of the pivoting leg can be integrally connected to one another by a bend. The rigidity of the pivoting leg of the retaining spring is advantageously increased in a simple constructive manner.

In a further preferred embodiment of the invention, the pivoting leg of the retaining spring can have an opening in the region of the second leg of the bend, which is bent upward (i.e., directed against the conductor insertion direction), and of the first leg, which is bent downward (i.e., in the conductor insertion direction), into which the clamping leg engages in the latching state of the clamping leg. This results in an advantageously space-saving design of the retaining spring, and also results in an increased clamping force of the clamping spring.

It is also advantageous if the opening has a constriction in the region of the retaining device and the bend of the pivoting leg of the retaining spring according to a further development. This allows a latching device on the clamping leg of the clamping spring to be designed in an advantageously simple manner.

It is also advantageous if the clamping leg has a waist geometrically corresponding to the constriction, so that the clamping leg can move freely through the opening in the pivoting leg, for example. This results in an advantageously space-saving design of the retaining spring.

In a further preferred embodiment of the invention, the latching device of the clamping leg can be integrally formed on or with the clamping leg. This results in a simple design implementation of the latching device on the clamping leg.

It is also advantageous if the latching device of the clamping leg is flared from the clamping leg and is integrally connected to it. This latching device can, for example, take the form of a section of a hole or a recess, a web or hook.

It can also be provided that the latching device of the clamping leg is designed as a tab which is formed by the waist of the clamping leg and is therefore not flared. This also results in a simple design of the latching device.

It is also advantageous if the latching device of the clamping leg is designed as a curved tab and is integrally formed on the outside of the clamping leg.

In a further preferred embodiment of the invention, the support leg of the clamping spring can have an elongated hole-like opening arranged on both sides, along a line of symmetry of the support leg. Due to the length and width of the elongated hole, the stiffness of the support leg can be easily adjusted to the respective requirement by structurally simple design device.

It is also advantageous if, according to one variant, the pivoting leg has a cutout which is bounded by the retaining device of the pivoting leg.

In a further preferred embodiment of the invention, the restoring device can be arranged between the clamping spring and the electrical conductor in the latching state and can be displaced in and against the sliding direction. This results in an advantageously simple resetting of the clamping spring from the latching state.

It is also advantageous if, according to one embodiment, the restoring device is clamped in the clamping state between the clamping leg and a terminal housing in the latter. This results in a self-reinforcing clamping effect of the restoring device in the clamping state of the spring-loaded terminal.

It is also advantageous if the restoring device can be moved in the sliding direction according to one variant for resetting the clamping leg. This results in an easy-to-handle and safe resetting process of the clamping leg.

According to a further advantageous, a stop element can be applied to the retaining spring, on which the pressure surface is formed. The stop element—optionally with a bead—has the advantage that it can be shaped more optimally with the desired geometry by the injection molding process than if it were incorporated directly into the pressure surface of the spring, because the spring material permits only a limited ‘forming’ process.

According to another preferred embodiment of the invention, the pressure surface may have a bead-like depression. The bead-like depression realizes a bundling/centering of the strands in a simple way during connection in order to minimize a splicing of the strands. In addition, the force at which the strands splice can also be increased.

It is therefore advantageous if, according to one embodiment, the pressure surface has a self-centering effect due to the bead-like depression for the conductor or its core. In this way, a safe function of the pressure surface is ensured by an advantageously simple constructive design.

As already mentioned, according to a particularly advantageous embodiment, the retaining device can have at least one hook or several hooks, in particular two hooks.

The respective hook can then preferably be punched out of the retaining leg laterally at the edge of the retaining leg and bent into hook shape. The hook or hooks can further have a long leg and a short or hook leg. The hook leg can preferably be aligned at an angle β of 90° to 100° to the long leg in order to be easily latchable on the one hand, but also easily releasable from the latch by pressure of a conductor end, even a fine-stranded one, on the holding surface. The hook leg is preferably of relatively short design so that it can be easily latched and securely seated in the latched state but can also be easily released from its latch by pressure from the conductor end when it is inserted into the clamping point. This design in the form of a hook shape allows the release and latching characteristics of the conductor connection to be adjusted particularly well.

According to a further optional design, the retaining device as the first latching device and/or the corresponding further latching device have one or more—in particular corresponding—chamfer(s) on one edge or several edges in order to optimize latching and unlatching of the respective retaining device s on the respective corresponding latching device. Preferably, at least one chamfer can be formed on an edge of the further latching device on the clamping leg that is directed upwards or essentially against the insertion direction of the conductor, against which the retaining device can come to rest in the latched state, at least on the edge side. The release and latching characteristics of the conductor connection can also be further optimized in this way.

The invention also relates to a terminal block or plug-in connector having one or more spring-loaded terminals.

BRIEF DESCRIPTION OF THE FIGURES

The invention is described in more detail below with reference to the accompanying drawings, wherein.

DETAILED DESCRIPTION

Figure 1A:
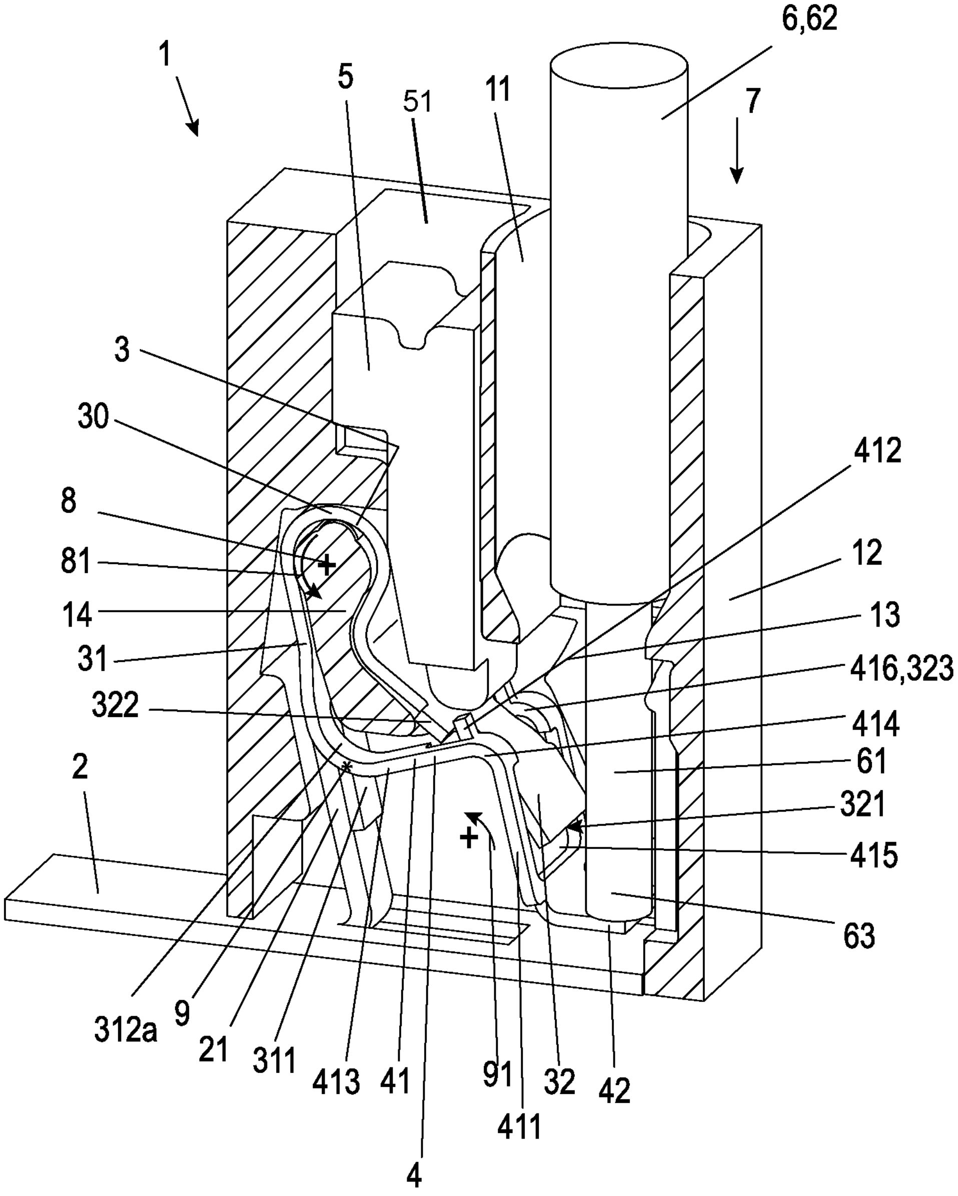
FIG. 1*a* is a partial sectional perspective view of a spring-loaded terminal according to the invention having a clamping leg in the latching state, which is provided for clamping an electrical conductor inserted into the spring-loaded terminal.

FIG. 1*a* shows a spring-loaded or spring-biased terminal 1 as a connecting device for electrical conductors. The conductors to be connected are designed in particular as stripped conductor ends. These conductor ends can also be designed as fine-stranded conductors or stranded conductors. However, the spring-loaded terminal is also suitable for solid conductors. The spring-loaded terminal can be used in various ways, for example as a connecting device for a terminal block 100 (see FIG. 4) or as a spring-loaded terminal 1 for connectors or the like (not shown). Other applications not shown here are also conceivable.

Figure 1B:
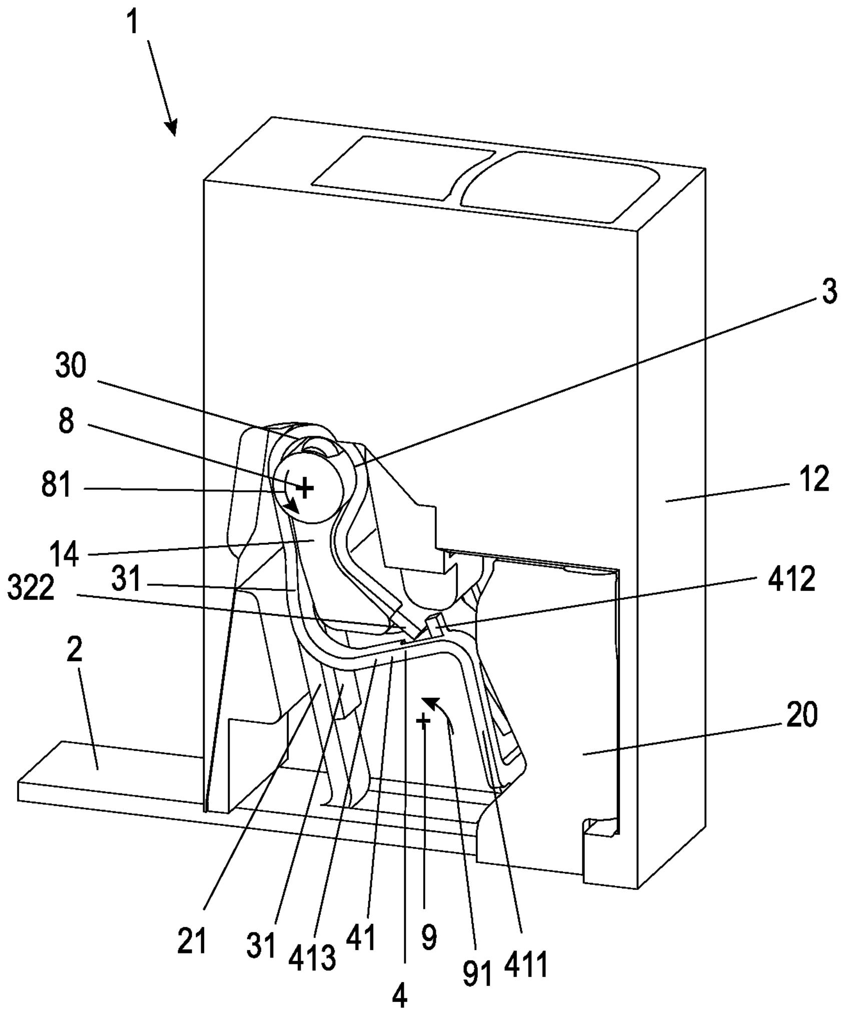
FIG. 1*b* is a cutaway view of the spring-loaded terminal according to the invention from FIG. 1*a* without an electrical conductor.
Figure 2A:
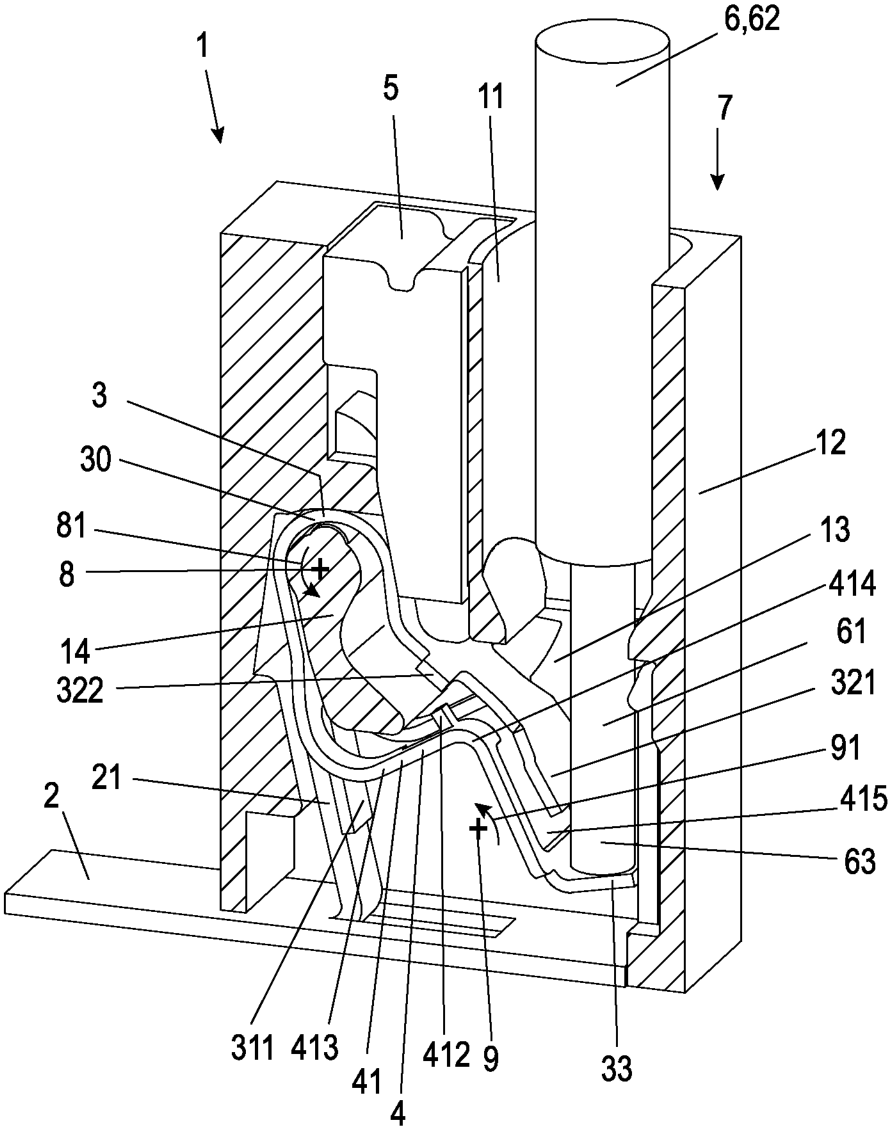
FIG. 2*a* is a partial sectional perspective view in section of a spring-loaded terminal according to the invention having a clamping leg in the clamping state.
Figure 2B:
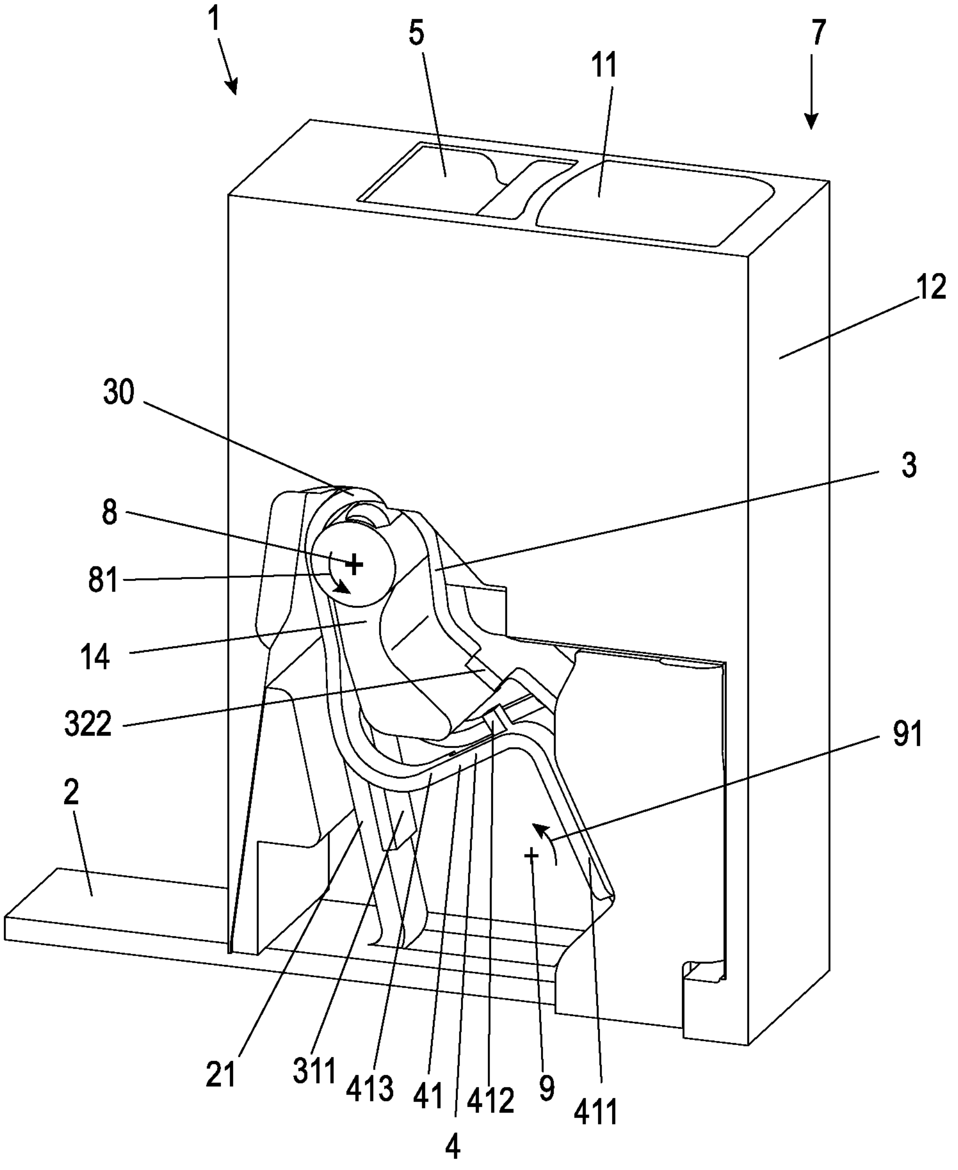
FIG. 2*b* is a cutaway view of the spring-loaded terminal according to the invention from FIG. 2*a* without an electrical conductor.
Figure 3:
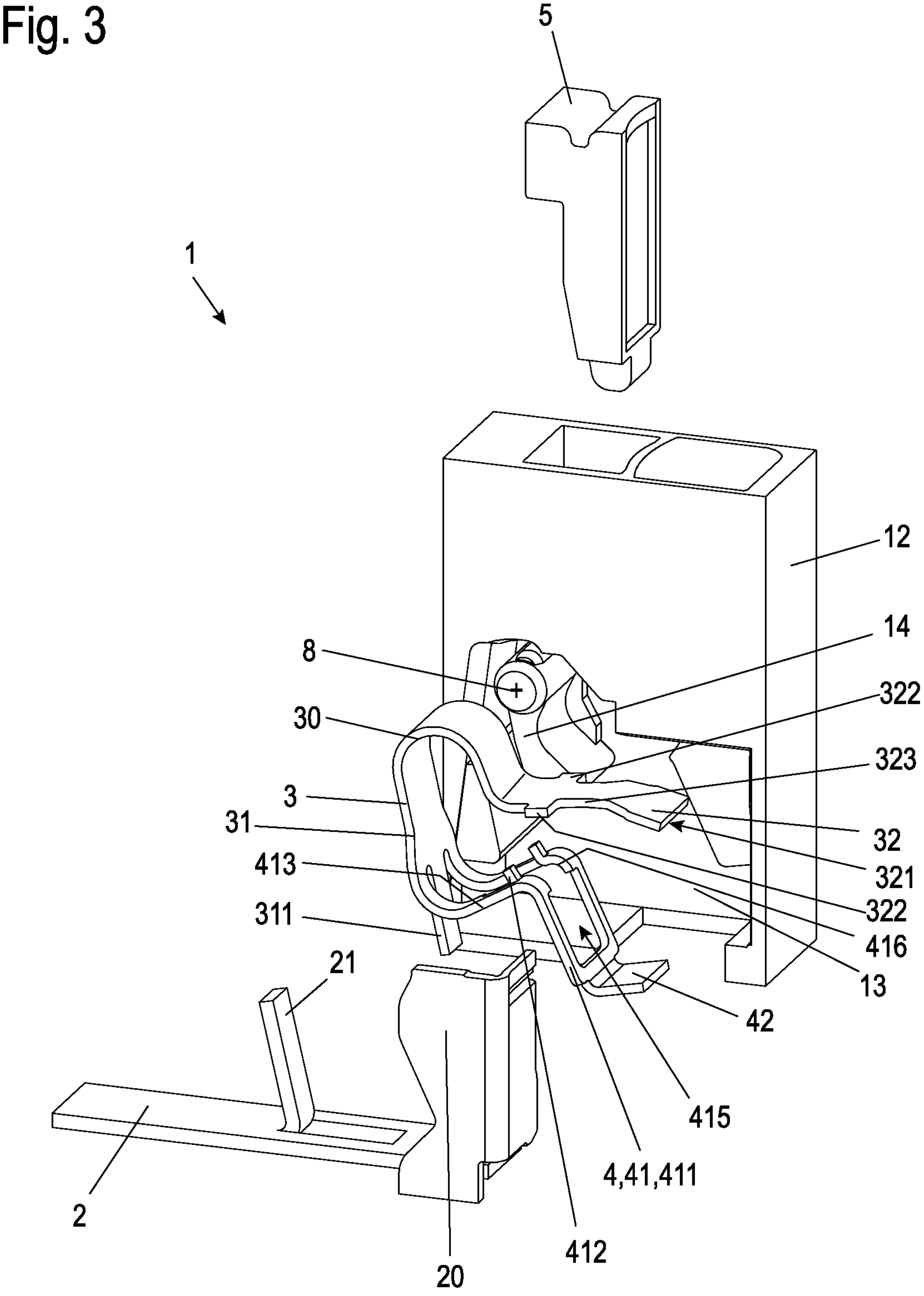
FIG. 3 is an exploded view of the spring-loaded terminal of FIG. 1 or FIG. 2 according to the invention.

The spring-loaded terminal 1 has a busbar 2 for contacting an electrical conductor 6. The busbar 2 can be L-shaped. However, it can also be part of a multiwalled clamping cage 20 as shown in FIG. 1*b* and FIG. 2*b*. The clamping cage can be U-shaped in plan view so that a conductor end can be inserted into the cross-section of the U and can also have a lower transverse wall.

The spring-loaded terminal 1 then has a clamping spring 3 acting as a compression spring, which is provided for clamping the electrical conductor 6 in the spring-loaded terminal 1, whereby the electrical conductor 6 permanently makes electrically conductive contact with the busbar 2. The clamping spring 3 thus serves to press the conductor 6 against the busbar 2.

In addition to the clamping spring, a retaining spring 4 is provided. This serves to latch a part of the clamping spring 3, namely a clamping leg 32, in an open position so that the conductor 6 can be inserted into an insertion opening 11 of the spring-loaded terminal 1 up to a contacting area when the clamping spring is open and tensioned.

The clamping spring 3 can be made in one piece with the retaining spring 4. However, the retaining spring 4 can also be manufactured separately from the clamping spring 3. The retaining spring 4 can then be connected to the clamping spring 3.

Preferably, the "clamping spring arrangement" according to FIG. 1*a* (and FIGS. 1*b*, 2*a* and 2*b*, 5*a* to 5*d* as well as 7*a* to 7*g*) creates a component that integrates the function of the clamping spring 3 and the function of the retaining spring 4 in one component—i.e. in one piece. This functionally integrated design of the clamping spring 3 with the integrally formed retaining spring 4 is advantageous, but not mandatory.

The busbar 2 and the clamping spring 3 are arranged in the terminal housing 12, which is preferably made of an electrically insulating material, in particular a plastic. An insertion opening 11 is provided in the terminal housing 12 for inserting the electrical conductor 6.

The illustrated electrical conductor 6 has an electrically insulating sheath 62 stripped above an open end 63 of the electrical conductor 6, so that a core 61 of the electrical conductor 6 is visible.

The clamping spring 3 has a clamping leg 32 which can be pivoted about a pivot axis 8 in and against a pivoting direction 81, and a support leg 31 with which it is supported in a simple and secure manner on a corresponding abutment, in particular when the clamping leg 32 is pivoted. This abutment can be designed as a support leg 21. This can be integrally formed on the busbar 2 or bent out of it. However, in other embodiments (not shown), the support leg 31 can also be supported in other ways, such as directly in the terminal housing 12.

Here, the support leg 31 has a centrally arranged retaining tab 311. This can be bent out of the retaining limb 31. The retaining tab 311 is supported on the abutment, on a corresponding support, here an abutment leg 21.

Preferably, the support leg 31 and the clamping leg 32 of the clamping spring 3 are connected to each other via a bend 30. This bend 30 can be engaged by a support contour 14 of the terminal housing 12, which contains the axis of rotation 8 and which can also serve as a movement limitation for the clamping leg 32. The clamping spring 3 has an overall approximately V-shaped configuration.

Two connecting legs 312*a*, 312*b* extend to the side of the retaining tab 311 and serve as connecting devices to the retaining spring 4, which is integrally connected to the clamping spring 3. However, the retaining spring 4 could also be attached to the clamping spring, for example to the support leg 31 as a separately manufactured component, thus attached to the support leg 31.

The connecting legs 312*a*, 312*b* form an angular, in particular approximately right-angled, bend to the retaining spring 4.

The retaining spring 4 then has a pivoting leg 41. This pivoting leg 41 can be bent in itself—in particular to increase its strength. It can also have a pressure surface 42 at a free end, on which the conductor end meets when it is inserted in a conductor insertion direction 7, so that the conductor end can move the pivoting leg 41.

In this respect, the pivoting leg 41 is designed to pivot resiliently relative to the clamping spring 3, in particular relative to its support leg 31. The pivoting leg 31 can be connected to or formed onto the two connecting legs 312*a*, 312*b*, or is integrally formed onto them.

The retaining spring 4 or its pivoting leg 41 is pivotable about a second pivot axis 9 in and against a second pivoting direction 91. In order to be able to pivot the clamping leg 32 in the second pivoting direction 91, the retaining spring 4 includes the pressure surface 42 with which the pivoting leg can be pivoted.

The pressure surface 42 can be arranged transversely to a conductor insertion direction or sliding direction 7. By exerting pressure with the respective conductor end of a conductor to be inserted on the pressure surface 42, the retaining spring 4 can be pivoted in the second pivoting direction 91. The pressure surface 42 adjoins a first, downwardly curved leg 411 of the pivoting leg 41.

One or more retaining devices 412—preferably provided in one piece on the pivoting leg 41, in particular integrally formed—are formed on the pivoting leg 41. The retaining devices 412 are preferably two latching edges arranged approximately at the end of a second, upwardly bent leg 413 of the angular pivoting leg 41. The first, downwardly bent leg 411 and the second, upwardly bent leg 413 are integrally connected to each other by a bend 414.

The clamping leg 32 of the clamping spring 3 has at least one or more latching devices 322. This one or more—here two—latching devices are formed at a distance from a clamping edge 321—approximately halfway along the longitudinal extension of the clamping leg. The one or more latching devices are configured to be latched to the retaining devices 412 of the pivoting leg 41 of the retaining spring 4, which in turn allows the clamping leg to be latched in an open position (referred to as the latching state). The latching devices 322 are preferably formed at a distance of more than 1 mm, in particular more than 2 mm, from the clamping edge 321, so that the latter cannot be damaged when the terminal is connected to or disconnected from a conductor. The latching devices 322 are not in an operative relationship with the clamping edge 321, i.e., they cannot be latched to the latter, so that they cannot damage the clamping edge in use. Rather, the latching devices 322 are in operative connection with the retaining devices 412, so that the clamping edge is not latched.

The latching devices 322 may be integrally formed with the clamping leg 32. They may protrude from the clamping leg 32 or be formed therein as a recess or step. They form a latching connection with the retaining devices 412 of the pivoting leg 41 of the retaining spring 4 in the latching state of the clamping leg 32. In this way, the clamping spring 3 can be locked in an open position from which it is released when the conductor is inserted.

Here, the pivoting leg 41 has an opening 415 in the region of the second, upwardly bent leg 413, i.e. in extension of the connecting legs 31*a*, 31*b*, the bend 414 and the first downwardly bent leg 411, into which the clamping leg 32 can enter in the latching state of the clamping leg 32. The opening 415 has a constriction 416 in the region of the retaining devices 412 and the bend 414. In this way, a compact design is provided.

Accordingly, the clamping leg 32 has a geometrically corresponding waist 323, which directly adjoins the latching edges 322 (see also FIG. 2*a*, FIG. 3 and FIGS. 5*a* and 5*c*), so that the clamping leg 32 can move freely through the opening 415.

When the retaining spring 4 pivots about the second pivot axis 9, it pivots the retaining devices 412 against the restoring force of the pivoting leg 41. This changes the position of the retaining devices 412 until the clamping leg 32 of the clamping spring 3 is disengaged.

A clearance 13 is formed between the clamping spring 3 and the busbar 2, into which the electrical conductor 6 can be inserted in a freely displaceable manner in and against the sliding direction 7 in the latching state of the clamping leg 32.

When the electrical conductor 6 inserted into the spring-loaded terminal 1 is moved in the sliding direction 7, the free or open end 63 of the electrical conductor 6 comes into contact with the pressure surface 42. This state is shown in FIG. 1*a* as well as in FIG. 1*b*.

As the conductor 6 is pushed further in the pushing direction 7, it presses on the pressure surface 42, causing the pivoting leg 41 to pivot in the second pivoting direction 91. In the process, the clamping leg 32 is disengaged from the retaining devices 412 and pivoted in the pivoting direction 81 into a clamping state, as shown in FIG. 2*a* and FIG. 2*b*. The pressure surface 42 is arranged below the retaining devices 412 in the sliding direction 7, so that free pivoting of the clamping leg 32 in and against the pivoting direction 81 is possible in a simple and safe manner.

The spring-loaded terminal 1 can also have a restoring device 5. The restoring device 5 is displaceable in and against the sliding direction 7. It is provided for pivoting back the clamping leg 32 of the clamping spring 3 against the pivoting direction 81. In this case, the clamping leg 32 can be pivoted back from the clamping state to the latching state by displacing the restoring device 5 against the pivoting direction 7, so that the latching devices 322 of the clamping leg 32 of the clamping spring 3 latches again with the retaining devices 412 of the pivoting leg 41 of the retaining spring 4. Then an electrical conductor 6 previously jammed in the spring-loaded terminal 1 in the clamping state can be removed from the spring-loaded terminal 1 in the latching state again.

In the embodiment shown here, the restoring device 5 in the latching state shown in FIG. 1*a* and FIG. 1*b* and in the clamping state shown in FIG. 2*a* and FIG. 2*b* is arranged above the latching devices 322 integrally formed on the clamping leg 32. Therefore, when the clamping leg 32 is in the clamping state, the restoring device 5 acts directly on the clamping leg 32 when it is displaced in the sliding direction 7, so that the required displacement path for pivoting the clamping leg 32 back is small. The restoring device is also formed essentially between the clamping spring and the conductor.

For actuating the restoring device 5, the latter can have an actuating groove which simplifies actuation with a tool such as a screwdriver. In addition, the restoring device 5 is clamped between the clamping leg 32 and the terminal housing 12 in the clamping state, so that it does not detach from the terminal housing 12.

FIG. 1*a* and FIG. 1*b* show the clamping spring 3 and the retaining spring 4 in the latching state of the clamping leg 32 of the clamping spring 3. It can be seen that the clamping leg 32 is latched to the retaining devices 412 of the pivoting leg 41 of the retaining spring 4 via its latching devices 322, which are formed along approximately half of the longitudinal extension of the clamping leg 32. Also clearly visible in FIG. 1*a* is the clearance 13 between the busbar 2 and the clamping leg 32.

FIG. 2*a* shows the electrical conductor 6 clamped in the spring-loaded terminal 1. The clamping leg 32 of the clamping spring 3 is pivoted about the pivot axis 8 in the pivoting direction 81 and its clamping edge 321 presses the core 61 of the electrical conductor 6 against the busbar 2. It is also visible that the clamping leg 32 presses the restoring device 5 against the sliding direction 7 when pivoted in the pivoting direction 81. This causes the restoring device 5 to move against the sliding direction 7.

Release of the electrical conductor 6 is possible by displacing the restoring device 5 starting from this clamping state in the sliding direction 7 until the latching devices 322 of the clamping leg 32 of the clamping spring 3 latches again with the retaining devices 412 of the pivoting leg 41 of the retaining spring 4 in the latching state.

Figure 4:
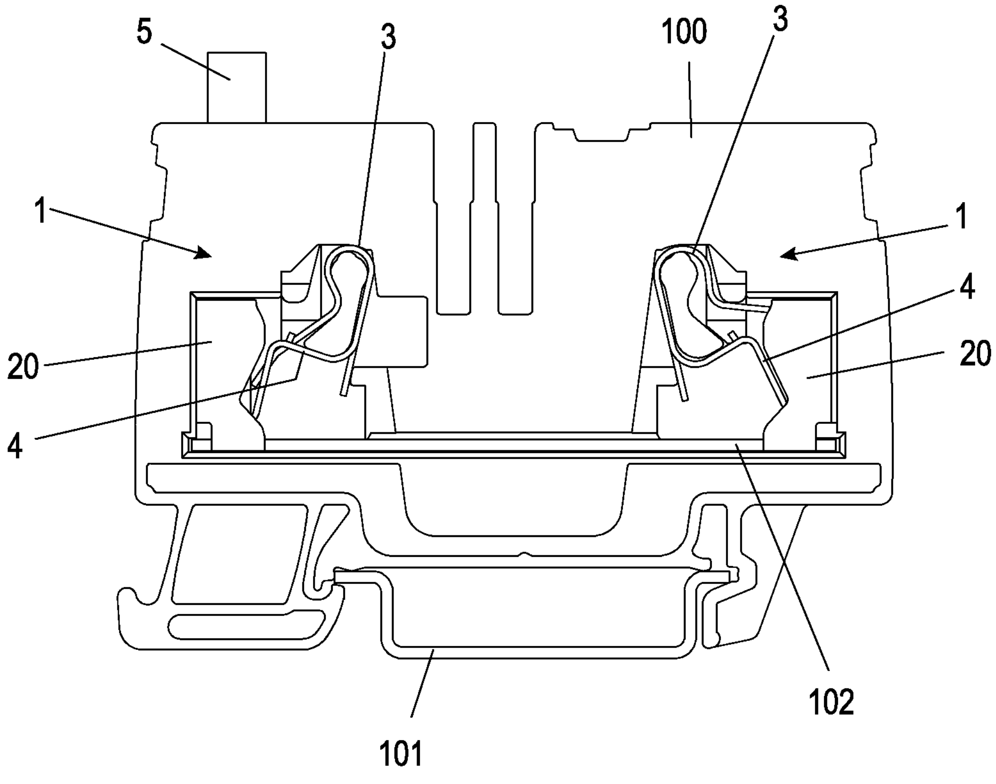
FIG. 4 is a partial cutaway front view of a terminal block with two spring-loaded terminals according to the invention as connecting devices.

FIG. 4 shows a terminal block 100 mounted on a mounting rail 101. The mounting rail 101 is intended for aligning several terminal blocks 100 on the mounting rail 101. Usually, the mounting rail 101 with the aligned terminal blocks 100 is accommodated in a terminal box or in a control cabinet.

Each terminal block 100 may have one or more spring-loaded terminals 1, each of which may be connected by a continuous busbar 102.

Figure 5A:
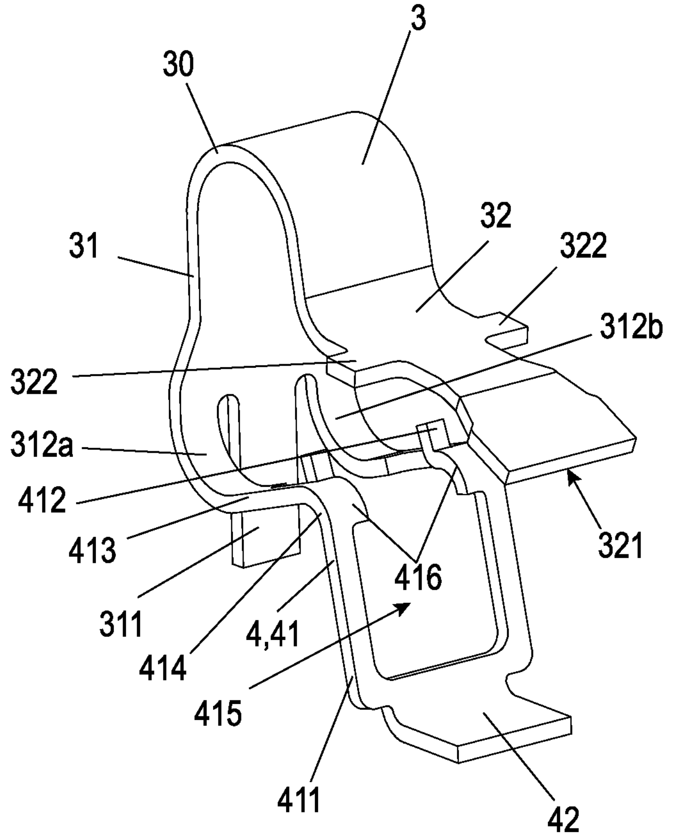
FIGS. 5*a* and 5*b* are perspective and front views, respectively, of a clamping spring of the spring-loaded terminal according to the invention from FIGS. 1 to 4 in a state before assembly.
Figure 5B:
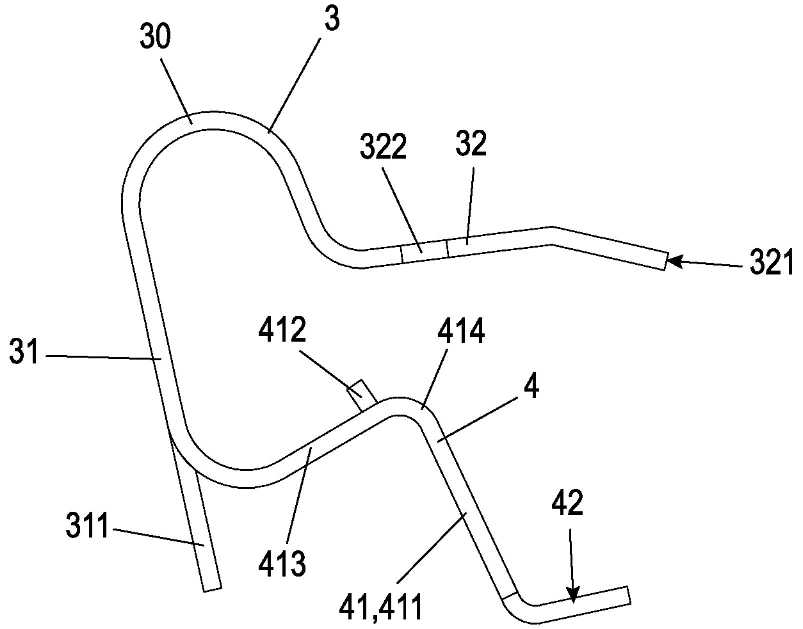
Figure 5C:
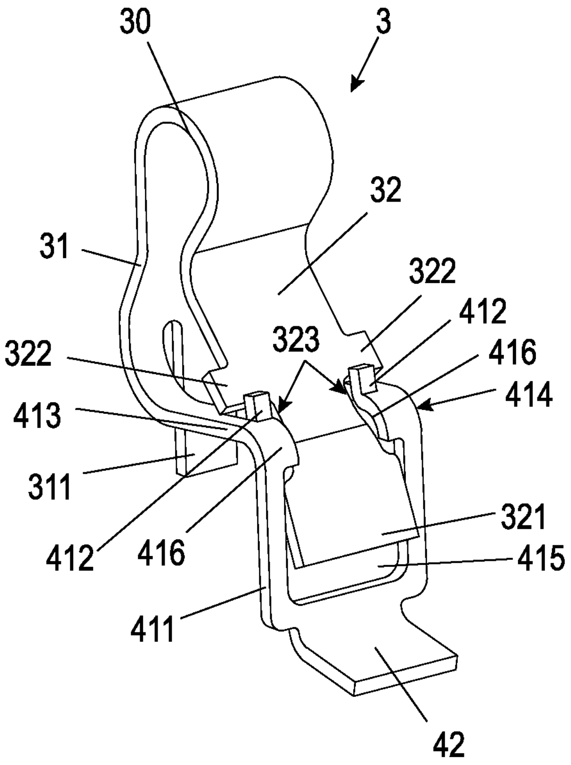
FIG. 5*c* is a perspective view of the clamping spring from FIG. 1*a* in a latching state or tensioned state.
Figure 5D:
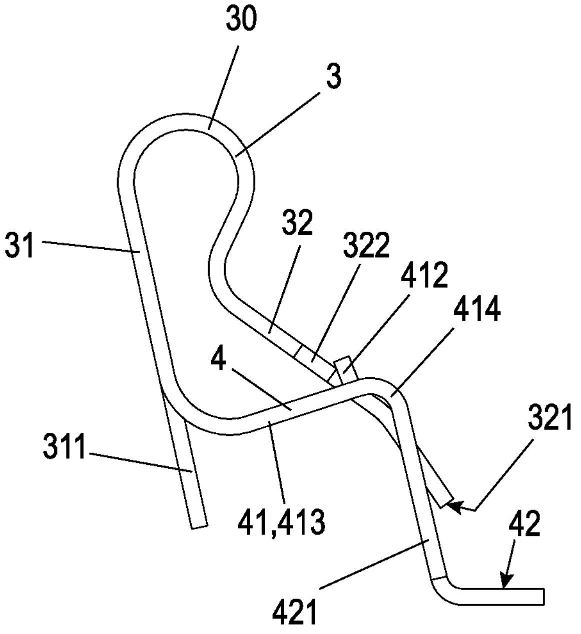
FIG. 5*d* is a front view of the clamping spring from FIG. 1*c;*

FIGS. 5*b* and 5*d* show the embodiment of the clamping spring 3 according to FIGS. 1*a*, 1*b*, 2*a*, 2*b*, 3 as well as 5*a* and 5*c* in each case in a front view in a relaxed state before mounting of the clamping spring 3, here integrally connected to the retaining spring 4, in the terminal housing 12 (FIG. 5*b*) as well as in the latching state (FIG. 5*d*).

Figure 6A:
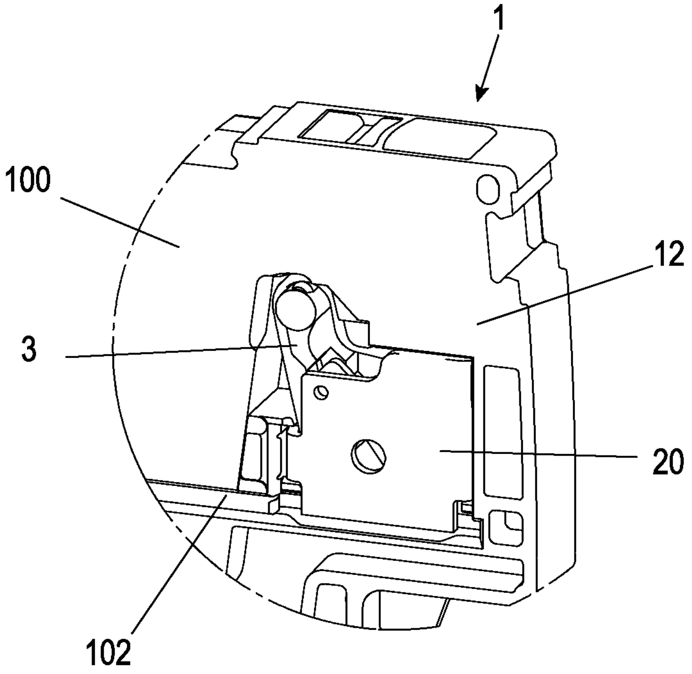
FIGS. 6*a* and 6*b* are enlarged partial sectional and front views, respectively of the terminal block from FIG. 4 with an embodiment of the spring-loaded terminal from FIGS. 1*a* to 3 without an electrical conductor.
Figure 6B:
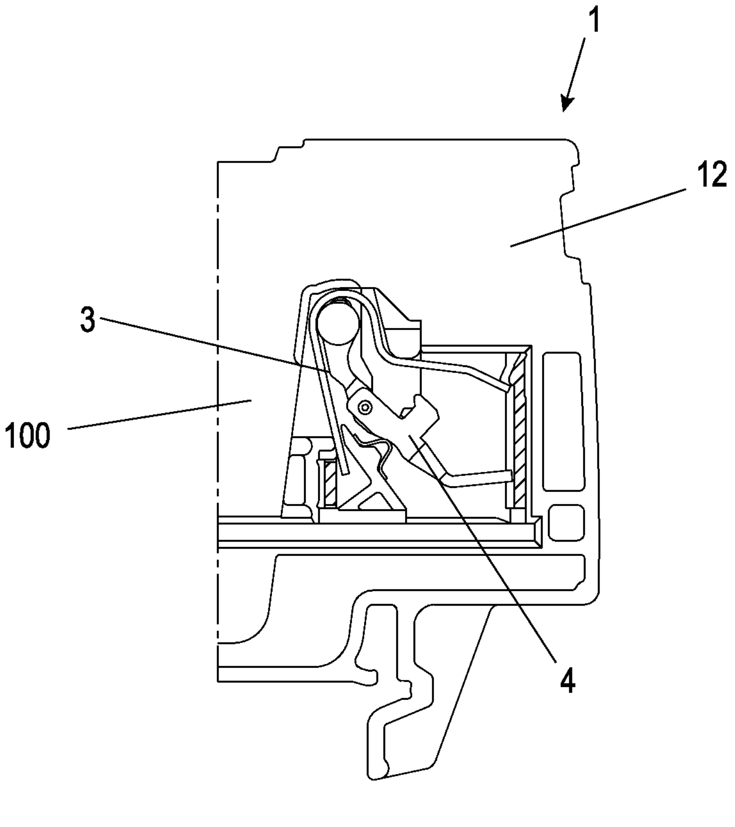
Figure 6C:
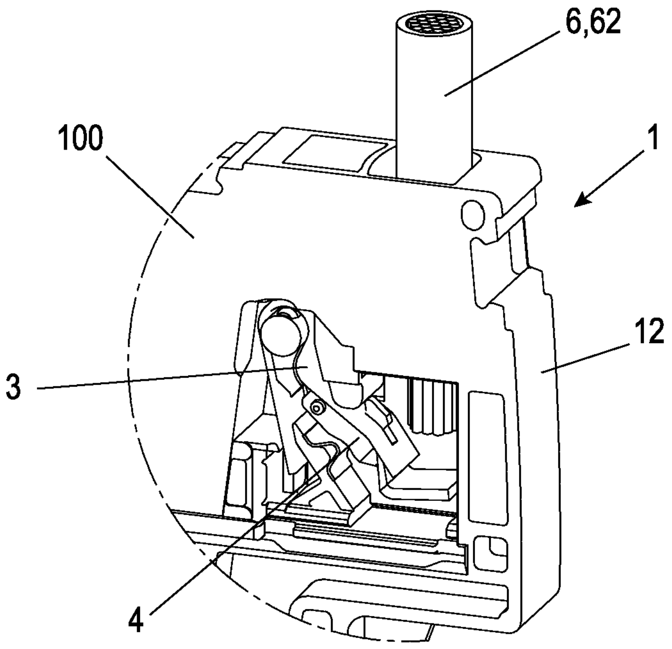
FIGS. 6*c* and 6*d* are enlarged partial sectional and front views, respectively, of the terminal block of FIG. 4 with the spring-loaded terminal of FIGS. 1*a* to 3 with an electrical conductor.
Figure 6D:
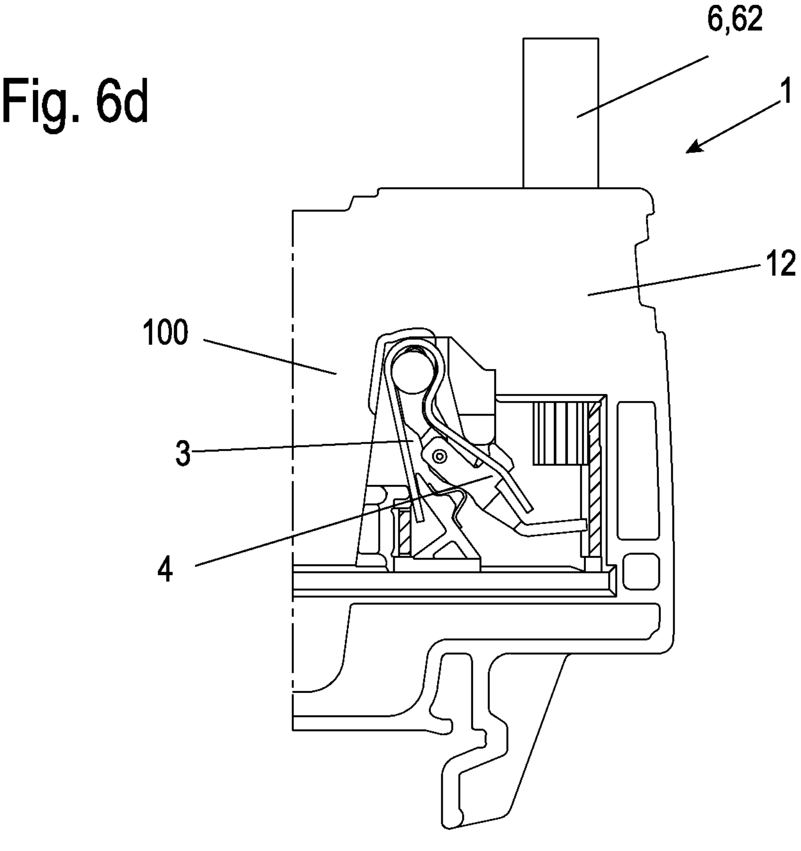
Figure 6E:
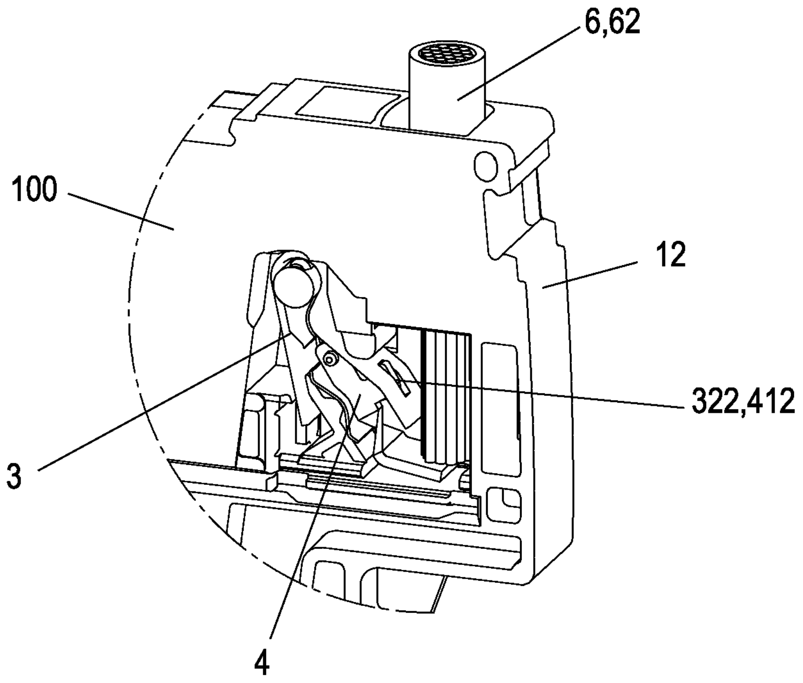
FIGS. 6*e* and 6*f* are enlarged partial sectional and front views, respectively, of the terminal block of FIG. 4 with and alternate embodiment of the spring-loaded terminal of FIGS. 1*a* to 3 including a latching device.
Figure 6F:
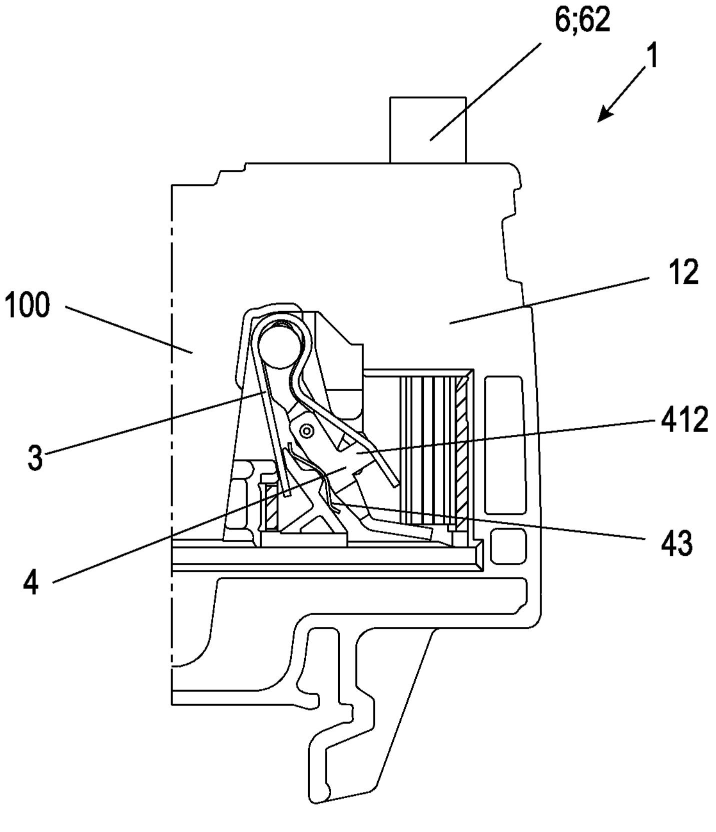
Figure 6G:
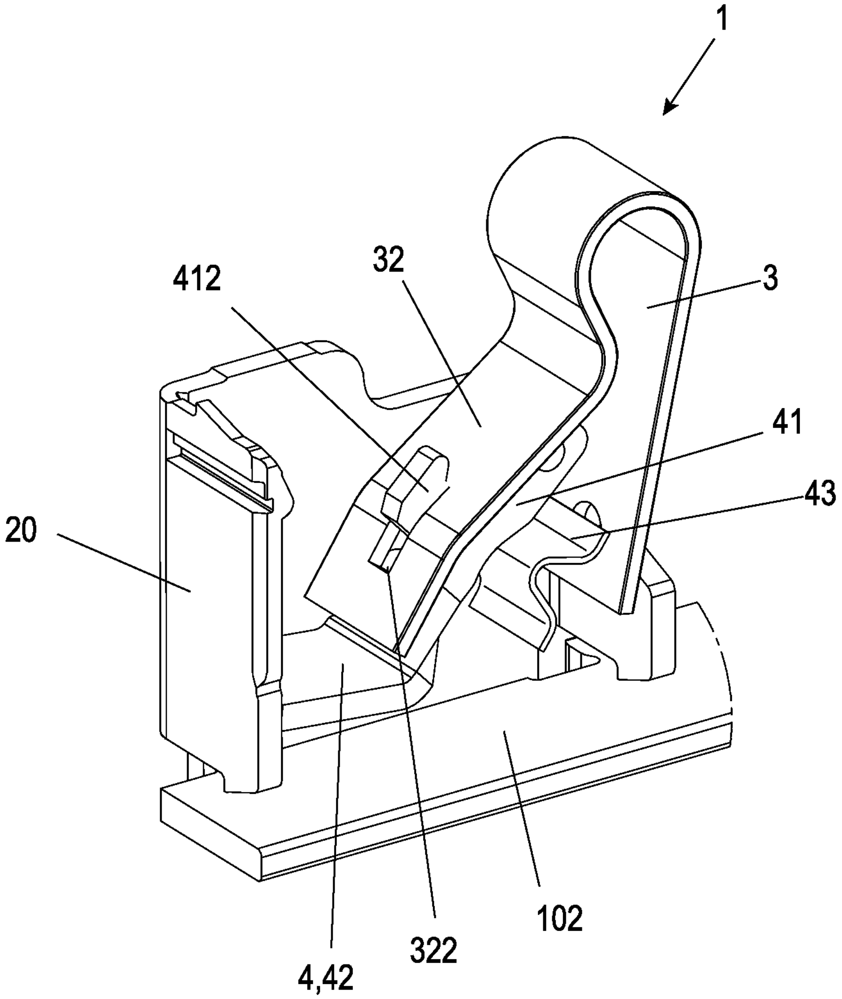
FIG. 6*g* is an enlarged perspective view of the clamping spring and the busbar of the spring-loaded terminal block from FIGS. 6*a* to FIG. 6*f;*

FIGS. 6*a* to 6*f* show in each case as a detail enlargement of a terminal block 100 a further embodiment of a spring-loaded terminal 1 according to the invention, in particular a further embodiment of the clamping spring 3. In FIG. 6*g*, the spring-loaded terminal is shown without the terminal housing 12. In order to avoid repetition, essentially only deviations, additions or changes to the spring-loaded terminal 1 and the clamping spring 3 as well as the retaining spring 4 in the embodiment variant according to FIGS. 6*a* to 6*g* are described below in relation to the spring-loaded terminal 1 and the clamping spring 3 according to FIGS. 1*a*, 1*b*, 2*a*, 2*b*, 3 and 5*a* to 5*d*. The other elements and features may be designed as in FIG. 1, to which reference is made.

As modified relative to the embodiment of the clamping spring 3 according to FIGS. 1*a*, 1*b*, 2*a*, 2*b*, 3 and 5*a* to 5*d*, the clamping spring 3 according to the embodiment of FIGS. 6*a* to 6*g* is not designed integrally with the retaining spring 4 or connected to it but is designed as a separate component to the retaining spring 4. In this respect, the clamping spring 3 is designed separately from the retaining spring 4.

The clamping spring 3 in turn has a clamping leg 32 that can be pivoted about a pivot axis 8 in a pivoting direction 81, as well as a retaining leg 31 with which it can be supported in a simple and secure manner on a corresponding abutment leg 21, in particular when the clamping leg 32 is pivoted. The support leg 31 has a central retaining tab 311 which is bent out of the leg 31. The retaining tab 311 is supported on the corresponding support device, in this case the abutment leg 21. However, in other embodiments (not shown), the support leg 31 may also be supported in other ways, such as directly in the terminal housing 12.

Preferably, the support leg 31 and the clamping leg 32 are connected to each other via a bend 30. A support contour 14 of the terminal housing 12 engages in this bend 30, which contains the axis of rotation 8 and which also serves as a movement limitation.

The spring-loaded terminal 1 has a separately manufactured retaining spring 4, which is pivotably mounted on the terminal housing 12. The retaining spring 4 has a pressure surface 42. By applying pressure to the pressure surface 42, the retaining spring 3 can be pivoted in the second pivoting direction 91. The retaining spring 4 further includes a pivoting leg 41. A retaining device 412 integrally formed on the pivoting leg 41 is arranged on the pivoting leg 41. Here, the retaining device 412 is a latching hook arranged approximately centrally on the pivoting leg 41.

The clamping leg 32 of the clamping spring 3 has, at a distance from its clamping edge 321—here approximately halfway along its length—a geometrically corresponding latching device 322 to the retaining device 412, which is in operative connection with the retaining device 412 of the pivoting leg 41 of the retaining spring 4 in a latching state of the clamping leg 32. The latching device 322 is designed here on the symmetry line of the clamping leg 32 as a recess or step formed in the clamping leg 32 and thus forms a latching connection with the retaining device 412 in the latching state of the clamping leg 32.

The spring-loaded terminal 1 may further include a leaf spring 43, which may additionally support the retaining spring 4.

FIGS. 7*a* to 7*h* and FIGS. 8*a* to 8*d* each show further particularly advantageous embodiments of clamping springs 3 designed integrally with the retaining spring 4.

Figure 7B:
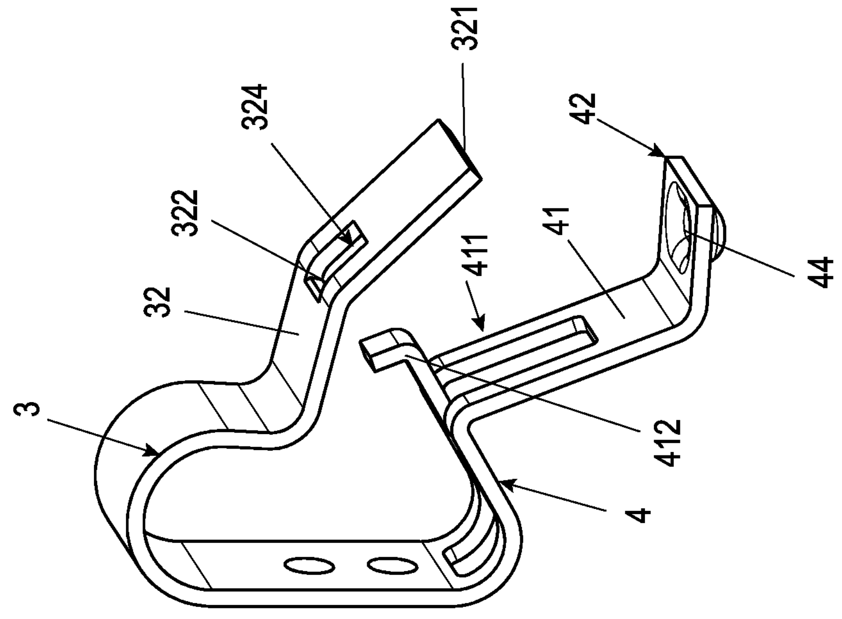
FIGS. 7*a*-7*d* are perspective views of further embodiments, respectively, of the clamping spring in an open state.
Figure 7A:
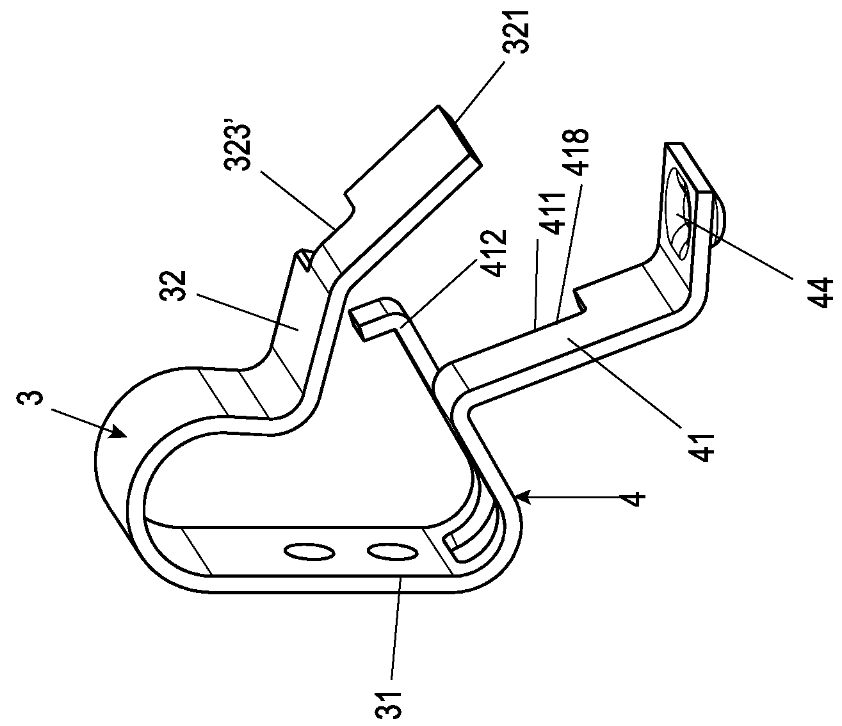

Thus, FIG. 7*a* illustrates a first further embodiment of a clamping spring 3 formed integrally with the retaining spring 4.

In this embodiment, the retaining device 412 of the pivoting leg 41 of the retaining spring 4 is formed as a single hook, preferably formed by a bent tab, which is integrally formed with the pivoting leg 41. The respective hook may be cut out of the pivoting leg 41 and bent out of it during manufacture. Its shape is exemplary. It may also have a slightly different shape, such as a differently shaped hook end.

The pivoting leg 41 can have a one-sided edge recess 418 as a result of the retaining device being punched out accordingly. Thus, the first, downwardly curved leg 411 of the pivoting leg 41 is narrow and, in particular, has a narrower design compared to the design of the retaining spring 4 according to FIGS. 1*a*, 1*b*, 2*a*, 2*b*, 3 and 5*a* to 5*d*. This design form is characterized by a very simple structure and a very compact design. A recess 323' on one side of the clamping leg 32 is provided for inserting the tab as a retaining device 412. It is advantageous that the retaining means 412 of the pivoting leg 41 of the retaining spring 4 can be arranged at a relatively large distance from the clamping edge. An edge, in this case a narrow edge, of this edge recess 323' acts as a corresponding counter-latching device for the latching "hook".

Deviating from the embodiment of the clamping spring 3 according to FIGS. 1*a*, 1*b*, 2*a*, 2*b*, 3 and 5*a* to 5*d*, the support leg 31 of the clamping spring 3—see FIG. 7*b*—may have an elongated, e.g. slot-like, opening. This can be arranged on both sides along a line of symmetry of the support leg 31.

FIG. 7*b* shows a further embodiment of the clamping spring 3 formed integrally with the retaining spring 4. The retaining device 412 of the pivoting leg 41 is again formed as a single hook which is cut out integrally from the pivoting leg 41 (in this case from its center) and is set down by bending upwards against the conductor insertion direction so that an elongated hole is formed in the pivoting leg 411.

According to FIG. 7*b*, the latching device 322 of the clamping leg 32 is formed by a hole, in particular an elongated hole 324 in the clamping leg 32, which is spaced from the clamping edge 321 and into which the hook of the leg 41 can dip for latching in the open position (not shown) in order to engage behind an edge of the hole. This embodiment is also simple to manufacture and is thus inexpensive and secure. The clamping edge 321 is again advantageously protected since it does not contribute to the locking of the clamping spring in the open position.

Figure 8:
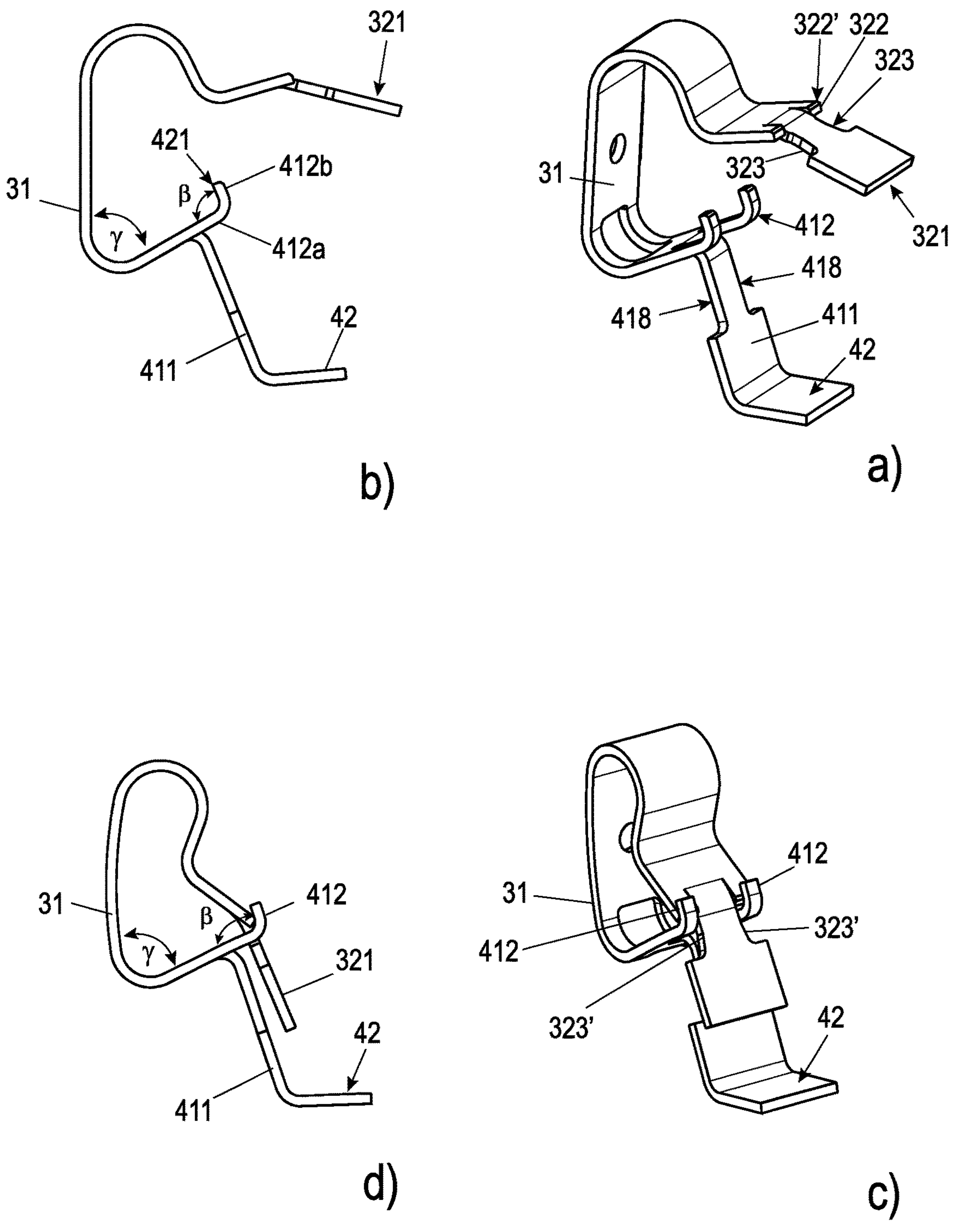
FIGS. 8*a* and 8*b* are a perspective view and a side view of a further embodiment of a clamping spring in a relaxed position and in an open state, respectively.
FIGS. 8*c* and 8*d* are perspective and side views, respectively, of the clamping spring from FIGS. 8*a* and 8*b* in a tensioned position and closed position.

Two or more hooks/tabs shaped in the manner of FIG. 7*a* or similarly can also be provided as retaining devices 412 (see FIG. 7*b* as well as FIGS. 8*a* to 8*d*) which in the latched state or open state can each engage behind edges on a waist or narrowed portion 323 of the clamping leg 321 (FIGS. 8*b*, 8*d*). Both hooks have been partially cut out and bent out of the pivoting leg 41 on the edge side during manufacture from the latter.

According to FIGS. 7*a* to 7*d* and 8*a* to 8*d*, both the clamping spring 3 and the retaining spring 4 can be formed from a single rectangular blank or strip of constant width, from which only tabs, webs or hooks punched from the blank have been exhibited and bent into shape and/or in which recesses or holes have been formed.

The embodiments of the clamping spring 3 formed integrally with the retaining spring 4 according to FIGS. 7*a* to 7*d* and 8*a* to 8*d* show low-cost embodiments of the clamping spring 3, since in these embodiments it can be assumed that the flat semi-finished product already has the finished width of the clamping spring 3, so that it only has to be cut or notched at the edge regions of the flat semi-finished product in order to produce the desired geometries at its edge regions for forming the clamping spring 3 or the retaining spring 4. As a result, waste or offcuts are very low.

According to FIGS. 7*a* to 7*d*, the pressure surface 42 of the retaining spring 4 can have a bead-like or rounded depression 44 into which the conductor end can dip during connection. The bead-like depression 44 easily realizes bundling/centering of the strands during connection to minimize splicing of the strands. In addition, the force at which the strands splice can also be increased.

Figure 7D:
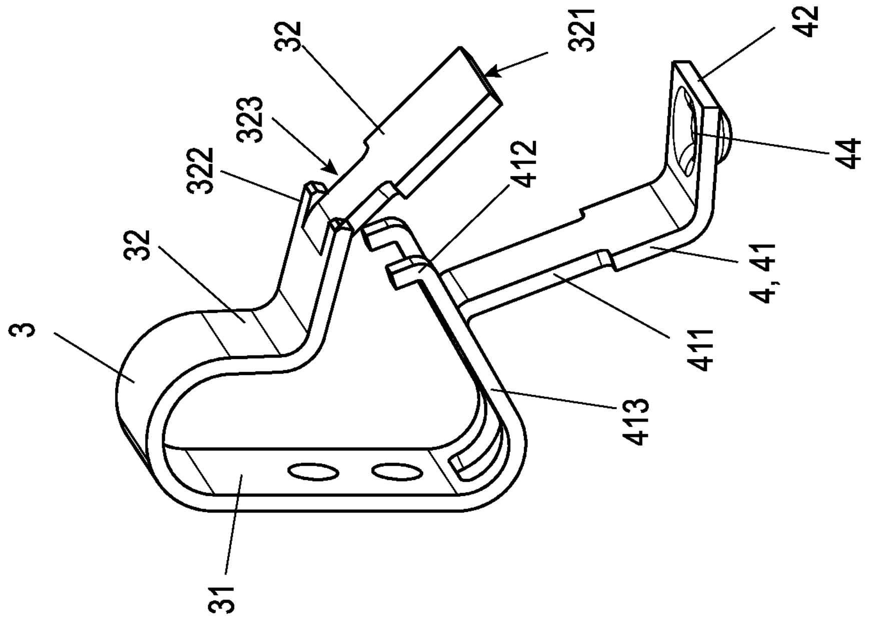
Figure 7C:
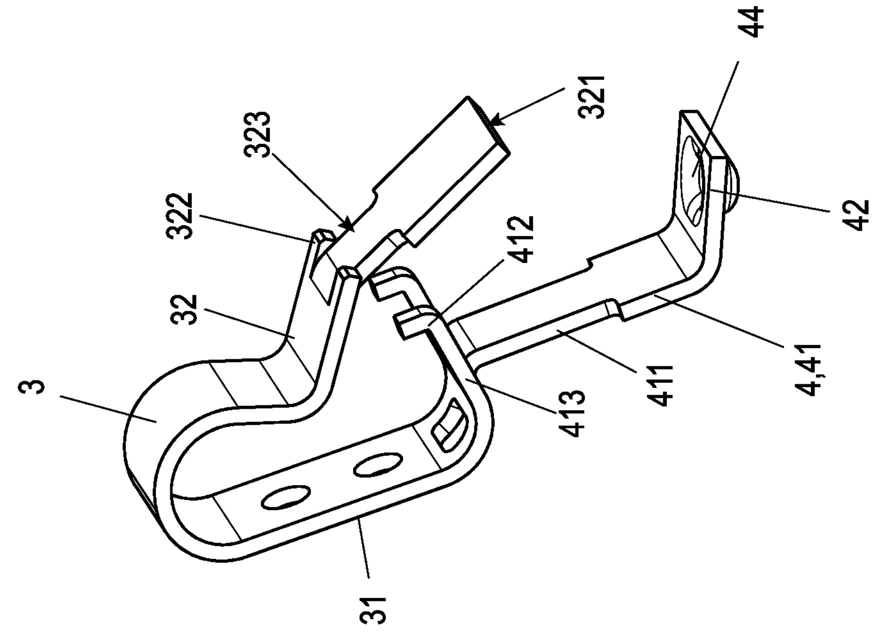
Figure 7F:
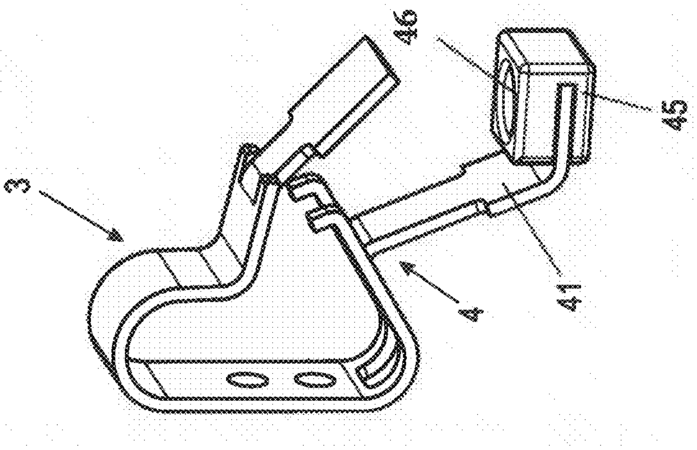
FIGS. 7*e* and 7*f* are perspective views of an embodiment of the clamping spring before and after the attachment of a functional element, respectively.
Figure 7E:
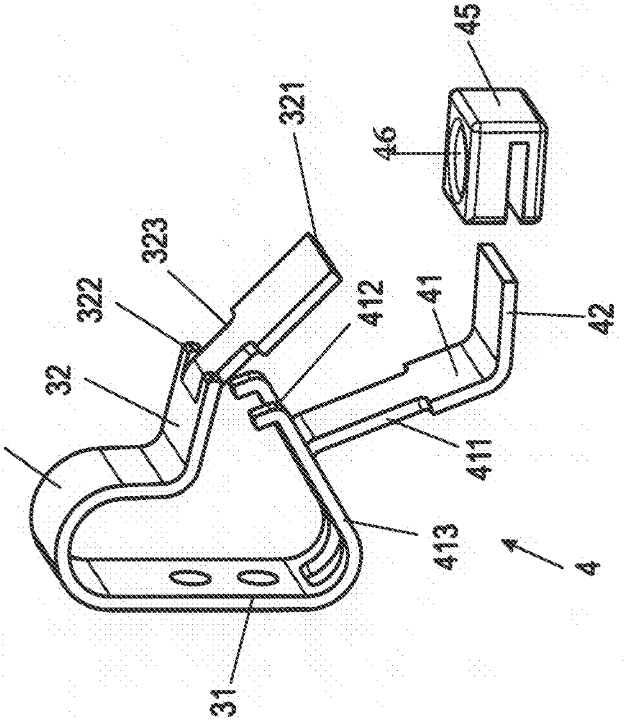

According to a further embodiment shown in FIGS. 7*e* and 7*f*, a stop element 45 can be applied to the retaining spring 4, on which the actual pressure surface is formed. This pressure surface can in turn be designed as a bead or rounded depression 46 in the stop element. The stop element 45 can be pushed onto the retaining spring 4. It can, for example, be designed as a type of block element made of plastic, which is pushed onto the area of the retaining spring 4 that would serve as the pressure surface without the stop element 45 (FIGS. 7*e*, 7*f*). However, the stop element 45 can also be applied to the area of the retaining spring 4, which would serve as a pressure surface without the stop element 45, by an injection molding process (not shown).

In the embodiment of FIGS. 8*a* to 8*d*, however, the pressure surface 42 of the retaining spring 4, by way of example, does not have a bead-like depression 44 or a functional element 45, but is of flat design. Even in this manner, the pressure surface 42 operates to release the clamping spring from the latching state.

The pivoting leg 41 of the exemplary embodiments according to FIGS. 7*a* to 7*f* can correspondingly have an edge recess 418 on one side as a result of the punching out or have such an edge recess 418 on both sides at its edges as also shown in FIGS. 8*a* to 8*d*. In this way, the first, downwardly bent leg 411 of the pivoting leg 41 can be made narrow, in particular made narrower in comparison with the design of the retaining spring 4 according to FIGS. 1*a*, 1*b*, 2*a*, 2*b*, 3 and 5*a* to 5*d*.

These embodiments of FIGS. 7*c* and 7*d* and FIGS. 8*a* to 8*d* are characterized by a particularly simple structure and a very compact design.

Two respective edge-side recesses 323' can be provided on the clamping leg 32 for immersion of the two hooks as retaining devices 412. It is advantageous that the retaining devices 412 of the pivoting leg 41 of the retaining spring 4 can be arranged at a relatively large distance from the clamping edge.

The pivoting leg 41 of FIGS. 7*c* and 7*d*, 7*e* and 7*f*, and FIGS. 8*a* to 8*d* accordingly has two edge recesses 418 on the edge side as a result of punching out. These embodiments are also characterized by a very simple structure and a very compact design.

In the latched state, the hooks 412 can each engage edges as latching devices 322 to engage respective edges on a waist 323 of the clamping leg 321 as shown in FIGS. 7*c* and 7*d*.

The hook or hooks 412 preferably have a long leg 412*a* and a short or hook leg 412*b*. The hook leg 412*b* can preferably be aligned at an angle β of 90° to 100° to the long leg 412*a* in order to be easily latchable on the one hand, but also easily releasable from the latch by pressure of even a finely stranded conductor end on the holding surface 42.

According to a further embodiment, one or more of the latching devices 322—here designed as latching edges—can be provided with a chamfer 322'. The respective chamfer 322' can be designed as a chamfer. It can contribute to simplifying the latching of the latching leg as a result of the rear engagement of the latching devices 322 with the latching hook or hooks 412 in the open state.

The short or hook leg 412*b* can be relatively short and, above a bending radius of, for example, 0.3 to 0.5, can have a length of, for example, only 0.4 mm to 0.6 mm, in particular 0.5 mm, in order to be able to be securely latched and still be easily released. Overall, it thus has a length of 1.5 mm or less, in particular 1 mm or less. This length is particularly advantageous for a conductor cross-section of 2.5 mm. It can be adapted accordingly for other conductor cross-sections.

In this way, the release forces of the system can be defined very well. A chamfer can also be formed at the free end of the respective retaining devices 412, in particular the respective short leg 412*b* of the latching hook, in particular a chamfer of approx. 0.1 mm, in order to optimize the pivoting of the contact leg 32 into its latching position.

Finally, according to one embodiment, the leg 413 can have an angle γ of 50° to 70°, in particular 60°, with respect to the support leg 31 in order to optimize the pivoting-in of the contact leg 32 in interaction with the leg 413 with respect to an overlap of the latching.

The invention claimed is:

1. A plug-in spring-loaded terminal for connecting a conductor, comprising (a) a busbar for contacting the electrical conductor:

(b) a clamping spring which retains the electrical conductor in the terminal, said clamping spring having a pivotable clamping leg which is pivotable in a pivoting direction and having a clamping edge;

(c) a retaining spring including a pivoting leg which retains the clamping spring in a latching state in an open position so that the conductor can be inserted into a contact area in a sliding direction, said pivoting leg including at least one retaining device including at least one hook formed integrally with said pivoting leg and having at least one chamfer at a free end and said clamping leg including a latching device which cooperates with said retaining device in the latching state of said clamping leg, said clamping leg being adjustable from the latching state into a clamping state in which said clamping leg is released from said retaining device and presses the conductor with said clamping edge of said clamping leg against said busbar, said latching device of said clamping leg being spaced from said clamping edge of said clamping leg.

2. A plug-in spring-loaded terminal for connecting a conductor, comprising (a) a busbar for contacting the electrical conductor;

(b) a clamping spring which retains the electrical conductor in the terminal, said clamping spring having a pivotable clamping leg which is pivotable in a pivoting direction and having a clamping edge;

(c) a retaining spring having a pressure surface having a rounded depression and including a pivoting leg which retains the clamping spring in a latching state in an open position so that the conductor can be inserted into a contact area in a sliding direction, said pivoting leg including at least one retaining device and said clamping leg including a latching device which cooperates with said retaining device in the latching state of said clamping leg, said clamping leg being adjustable from the latching state into a clamping state in which said clamping leg is released from said retaining device and presses the conductor with said clamping edge of said clamping leg against said busbar, said latching device of said clamping leg being spaced from said clamping edge of said clamping leg.

3. A plug-in spring-loaded terminal for connecting a conductor, comprising (a) a busbar for contacting the electrical conductor;

(b) a clamping spring which retains the electrical conductor in the terminal, said clamping spring having a pivotable clamping leg which is pivotable in a pivoting direction and having a clamping edge;

(c) a retaining spring including a stop element having a pressure surface configured as a rounded depression and a pivoting leg which retains the clamping spring in a latching state in an open position so that the conductor can be inserted into a contact area in a sliding direction, said pivoting leg including at least one retaining device and said clamping leg including a latching device which cooperates with said retaining device in the latching state of said clamping leg, said clamping leg being adjustable from the latching state into a clamping state in which said clamping leg is released from said retaining device and presses the conductor with said clamping edge of said clamping leg against said busbar, said latching device of said clamping leg being spaced from said clamping edge of said clamping leg.

* * * * *